G. W. BAKER.
TREATMENT OF ORES.
No. 46,983.  Patented Mar. 28, 1865.
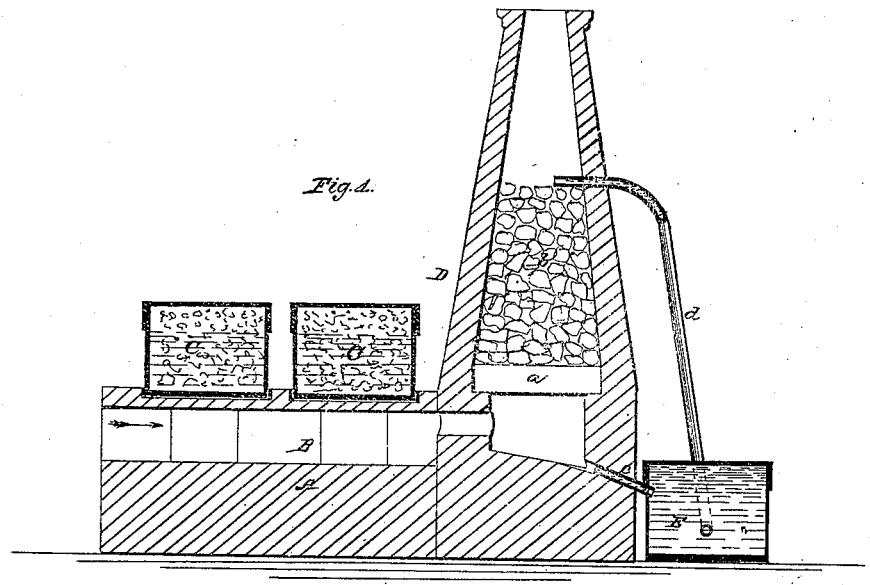
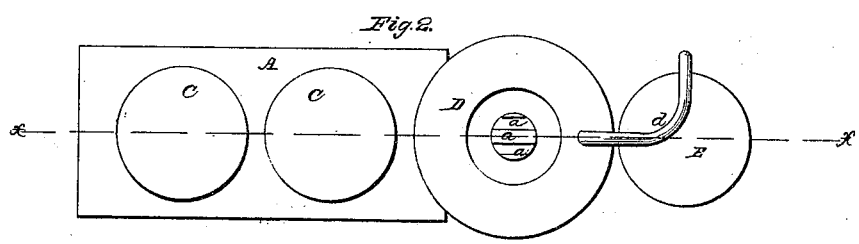

Specification forming part of Letters Patent No. 46,983, dated March 28, 1865.

UNITED STATES PATENT OFFICE.

G. W. BAKER, OF NEW YORK, N. Y.

IMPROVEMENT IN TREATING ORES.

*To all whom it may concern:*

Be it known that I, G. W. BAKER, of the city, county, and State of New York, have invented a new and useful Improvement in Treating Ores; and I do hereby declare that the following is a full, clear, and exact description thereof, which will enable others skilled in the art to make use of and fully understand the same, reference being had to the accompanying drawings, forming part of this specification, in which—

Figure 1 is a vertical section of a means whereby my improvement in treating ores is carried out. *x x*, Fig. 2, indicate the line of section. Fig. 2 is a plan or top view of the same.

Similar letters of reference indicate like parts.

This invention relates to a new and useful improvement in treating ores decomposed by heat and reclaiming soluble salts from insoluble oxides of the metals contained therein, especially copper.

My invention consists in the utilization of the waste heat and vapors produced by the various methods of calcining pyritical ores, more particularly the sulphurets, whether treated for the precious metals or for the baser metals alone, the sulphurous vapors being liquefied and forming liquid sulphurous acid, which, by the aid of the waste heat, is made to react on the oxides, which are insoluble in water, causing them to become soluble salts of the same metals. A clear and distinct understanding of this mode of treatment may be had from the following statement: The volatile constituents of pyrites, especially the sulphurets, holding in combination iron, copper, and the precious metals, are expelled by the application of heat alone or in connection with heated vapors of water or hydrocarbon fuel, the ore being placed in variously-contrived furnaces or chambers, wherein they are subjected to the decomposing influences of the said heat and vapors combined or singly. Ordinarily the heat thus accumulated and the vapors engendered by the decomposition of the ores are allowed to discharge themselves into the atmosphere as waste products, causing damage to vegetable existence and injurious effects on animal life in the immediate vicinity of the works. A complete decomposition of the ores causes a thorough oxidation of the base metals, unless treated with some chemical reagent, such as chloride of sodium. These oxides are insoluble in water, and consequently cannot be eliminated from the mass without resort to melting or a chemical reaction, by which soluble salts are reclaimed from the insoluble oxides.

For ores containing the precious metals no smelting process yet contrived is deemed practical. The retention of these oxides during the process of ordinary amalgamation or the solving and precipitation of the precious metals incumbers the process and in some respects prevents a complete separation and collection of the gold and silver, and even should they be retained until the precious metals are separated, the baser metals are mostly irreclaimable at a profit. In order to obviate these difficulties and produce a valuable metal or metals now almost wholly cast away in the treatment of auriferous and argentiferous pyrites, as before stated, I propose to take the calcined ores as they come from the furnaces, and, having them well pulverized, subject them to the action of sulphurous acid in tanks located over the main discharge-flues of the furnaces, whereby a sufficient heat may be obtained to assist in the reaction of the acid before mentioned. The sulphurous acid thus used is to be formed and collected by compelling the sulphurous vapors discharged from the furnace to pass over through and in contact with water, as hereinafter described, so that sulphurous acid will be formed and collected in a properly-arranged tank or tanks, from whence it may be conveyed to the ore-tanks, and there mixed with the ore thoroughly by agitation in any manner most convenient. After the ore has been subjected to the action of the acid for a couple of hours, the oxide of copper will be replaced by a sulphate soluble in water, and the oxide of iron will be partially brought into the same condition. Should there be any gold or silver held in solution, these metals will be reduced to the metallic state. The solution is then drawn off by siphon or otherwise and conveyed to another tank or vat, for subsequent treatment either by cementation or precipitation for the copper and evaporation for the sulphate of iron. The ore thus treated may then be lixiviated by water to wash out all the acid, and this water, which will still hold some dilute solution of the baser metals, may be conveyed to the acid-tank and used for the further formation of sulphurous acid, as described. By this means the most concentrated solution is alone permitted to pass to the tank or vat for further treatment. It may be considered a well-settled fact that in all processes of calcination some portion of the precious metals, if such ores are under treatment, escape mechanically or in a vaporized form. This loss, great or small as the case may be, has heretofore been to a great degree irreclaimable. It is claimed as a part of this improvement that such loss, whether mechanical or in the form of vapor, is wholly prevented by arresting their escape and returning them, either in solution or in the sediment of the liquid acid, to the ore when treated in the ore-tanks before mentioned.

The invention may be carried out by the following simple means:

A represents a brick or stone masonry inclosing a flue, B, into which the vapors from the furnace in which the ores are calcined are discharged. This masonry is so constructed that one or more tanks, C, can be placed immediately over the brick covering of the flue, and a layer of sand may be placed on the latter to form a sand bath, and tanks of lead may then be either fitted in the masonry or be placed on the sand, as most convenient. This flue B is continued to a shaft or chimney, D, into which the vapors are discharged at the bottom. The base of this shaft may have an internal upright conical chamber from four to six feet in diameter below and about two feet at the top and be of any height desirable, not less that twenty-five feet. Immediately above the entrance of the flue at the bottom of said chamber a series of flag-stones, $a$, three or four inches thick by two feet wide, are spanned across the base on edge and parallel with each other, and being well supported in the masonry of the shaft and separated three or four inches from each other, forming a chamber below them, the discharging vapors can readily find their way upward. Over these flags some large cobble-shaped stones $b$ may be laid, and upon them smaller stones of the same shape, until the shaft is filled fifteen or twenty feet high. The bottom of the shaft is made inclined, so as to allow the liquid to settle to one point freely, where an exit-pipe, $c$, is placed leading to a tank, E, outside of the shaft. From this tank another pipe, $d$, is arranged, so that by means of a pump the contents may be pumped up through the pipe to the top of the stones within the shaft, and be there discharged, when the water will percolate through the interstices of the stones and come in contact with the ascending vapors.

I claim as new and desire to secure by Letters Patent—

1. The utilization of the waste heat and vapors created in the treatment of pyrites containing the precious metals, in the manner substantially as and for the purposes set forth.

2. The forming of sulphurous acid, substantially as described, for the purpose of treating the calcined ores, whether containing only the baser metals or the baser metals with gold and silver.

3. The use of sulphurous acid thus formed in treating the calcined ores for the purpose of converting the insoluble oxides into soluble sulphates, especially copper, as described.

4. The method of obtaining a highly-concentrated solution of the baser metals by lixiviating with the acid and submitting the weaker solution, obtained by lixiviating with water, to the acidulating process, as set forth.

G. W. BAKER.

Witnesses:
M. M. LIVINGSTON,
C. L. TOPLIFF.